United States Patent [19]
Yamakoshi

[11] Patent Number: 5,322,354
[45] Date of Patent: Jun. 21, 1994

[54] PROPORTIONING VALVE

[75] Inventor: Mutsuro Yamakoshi, Saitama, Japan

[73] Assignee: Jidosha Kiki Co., Ltd., Tokyo, Japan

[21] Appl. No.: 8,967

[22] Filed: Jan. 26, 1993

[30] Foreign Application Priority Data

Feb. 7, 1992 [JP] Japan ............................ 4-013084[U]

[51] Int. Cl.⁵ ............................................. B60T 8/26
[52] U.S. Cl. ................................... 303/9.62; 188/349; 303/9.75
[58] Field of Search .................. 303/9.75, 9.69, 9.63, 303/9.62, 9.64, 9.65, 9.66, 9.67, 9.68, 9.71, 9.73, 1; 188/349, 195, 382; 60/591; 137/15

[56] References Cited

U.S. PATENT DOCUMENTS

| | | | |
|---|---|---|---|
| 3,603,648 | 9/1971 | Reznicek et al. | 188/349 X |
| 4,008,925 | 2/1977 | Young | 188/349 X |
| 5,167,441 | 12/1992 | Schonlau et al. | 188/349 X |

FOREIGN PATENT DOCUMENTS 63-148567  9/1988  Japan.
1549635  8/1979  United Kingdom ............... 303/9.75

Primary Examiner—Douglas C. Butler
Attorney, Agent, or Firm—Nixon & Vanderhye

[57] ABSTRACT

A proportioning valve of the present invention has a columnar portion protruding at the head of a retainer for slidably retaining a plunger. The outside diameter of columnar portion is set in such a manner that when a retaining ring, which inhibits the movement of the retainer in one direction, is completely set into an annular groove in a valve housing, the retaining ring is positioned around the columnar portion, and when the retaining ring gets out of the annular groove, the retaining ring is positioned at the end of columnar portion. A stopper for the plunger is disposed on the retainer so that a valve element cannot abut against a valve seat when the retainer is located at a position shifting in the output pressure direction.

5 Claims, 6 Drawing Sheets

PROPORTIONING VALVE

FIELD OF THE INVENTION AND RELATED ART STATEMENT

The present invention relates to a proportional valve and, more particularly, to a proportional valve in which the inspection of assembling condition of a retainer for plunger can be made easily.

FIG. 5 shows a proportioning valve which has been used in a load-sensitive type brake fluid pressure control device. This proportioning valve has two sets of proportioning mechanisms in a valve housing 1.

In this proportioning valve, a retainer 2 is disposed slidably on a wall 1a of cylinder hole of valve housing 1. A plunger 3 passes through the retainer 2, and is guided by the retainer 2. The retainer 2 defines an input pressure chamber 4. Between the retainer 2 and the flange 3a of plunger 3 is interposed a spring 5, by which the plunger 3 is energized in the direction such that a valve element 3b is away from a valve seat 6. In FIG. 5, reference numeral 7 denotes an output pressure chamber, and 8 a sensor lever.

With this proportioning valve, the valve housing 1 is installed to the vehicle chassis, and the free end of sensor lever 8 is connected to the axle via a not illustrated sensor spring. The input pressure chamber 4 of the proportioning valve is connected to a not illustrated master cylinder, and the output pressure chamber 7 is connected to a not illustrated wheel cylinder.

When being supplied to the input pressure chamber 4, the hydraulic oil from the master cylinder is sent to the output pressure chamber 7 passing between the valve seat 6 and the valve element 3b, and then from the output pressure chamber 7 to the wheel cylinder.

In this proportioning valve, the pressurizing area of plunger 3 by which the pressure in the input pressure chamber 4 acts in the valve opening direction (the direction in which the plunger is pushed down in FIG. 5) is set to be smaller than the pressurizing area of plunger 3 by which the pressure in the output pressure chamber 7 acts in the valve closing direction (the direction in which the plunger is pushed up in FIG. 5). Whereas, when the hydraulic oil of the same pressure is supplied to the input pressure chamber 4 and the output pressure chamber 7, the plunger 3 is energized in the valve closing direction toward the atmosphere side.

With this proportioning valve, since the energizing force in the direction in which the plunger 3 opens the valve is given by the spring 5 and the sensor spring (not shown), the valve is not closed until the force of hydraulic oil to move the plunger 3 overcomes the energizing force of these springs. During the time when the valve is open, therefore, the pressure in the output pressure chamber 7 increases the same as that in the input pressure chamber 4 as shown by the characteristic line OA in FIG. 6. When the force by which the plunger 3 opens the valve overcomes the energizing force of the spring 5 and the sensor spring (not shown), the plunger 3 moves upward, and the valve element 3b abuts against the valve seat 6.

When hydraulic oil is supplied into the input pressure chamber 4, its pressure temporarily moves the valve element 3b apart from the valve seat 6. By this movement, the hydraulic oil in the input pressure chamber 4 is supplied to the output pressure chamber 7, by which the valve element 3b abuts against the valve seat 6 again. While such valve opening and closing operations are repeated, the pressure in the output pressure chamber 7 is increased with respect to the pressure in the input pressure chamber 4 as indicated by the characteristic line AB in FIG. 6.

In this proportioning valve, an annular groove 1b is formed in the wall 1a of the cylinder hole as shown in FIG. 5. A retaining ring 9 is set into the annular groove 1b, and the retaining ring 9 is positioned at the head of the retainer 2, by which the retainer 2 is kept on the wall 1a of the cylinder hole.

When the retainer 2 is kept in such a manner, the retaining ring 9 must be completely set into the annular groove 1b to prevent the retainer 2 from moving out upward due to the pressure in the input pressure chamber 4.

For example, when the retaining ring 9 completely gets out of the annular groove 1b as shown in FIG. 7, the retainer 2 moves out upward, so that it can be confirmed in the characteristic test that the retaining ring 9 is not set into place.

However, if a part of the retaining ring 9 is being caught by the annular groove 1b as shown in FIG. 8, it cannot be found in the characteristic test that the retaining ring 9 is not set into place because the retainer 2 does not move out upward.

Therefore, with the conventional proportioning valve, another inspection method must be used to check whether the retaining ring 9 is completely set into the annular groove 1b.

OBJECT AND SUMMARY OF THE INVENTION

Accordingly, an object of the present invention is to provide a proportioning valve in which whether the retaining ring is completely set into the annular groove can be checked at the time of characteristic inspection.

To this end, in a proportioning valve having an input pressure chamber, a retainer which guides a plunger and is slidably in contact with the wall of cylinder hole, an annular groove formed in the wall of cylinder hole, and a retaining ring which is set into the annular groove and positioned at the head of the retainer to keep the retainer on the wall of cylinder hole, the proportioning valve comprises a columnar portion which protrudes at the head of the retainer and has an outside diameter which is smaller than the inside diameter of the retaining ring set into the annular groove and larger than the inside diameter of the retaining ring getting out of the annular groove, and a stopper which is disposed on the retainer and inhibits the movement of plunger in the valve closing direction, wherein if a part of the retaining ring is caught by the annular groove and the retaining ring is set incompletely, the retainer is located at a position shifting from the predetermined position toward the output pressure chamber, and if the plunger is moved in the valve closing direction under this condition, the plunger abuts against the stopper, thereby the valve being not closed.

In the proportioning valve of the present invention, when the characteristic test is made with a part of retaining ring being caught by the annular groove and the retaining ring being set incompletely, desired performance cannot be achieved because the plunger abuts against the stopper and the valve is not closed. In this case, the characteristic line has no inflection point. Therefore, such a proportioning valve is subject to rejection.

In the proportioning valve in accordance with the present invention, improper installation of retaining ring can be checked at the same time when the characteristic test is made. Therefore, visual inspection is not required in assembling the proportioning valve; the inspection work is eliminated. In addition, proper installation of retaining ring can be easily checked.

DETAILED DESCRIPTION OF PREFERRED EMBODIMENTS

Figure 1:
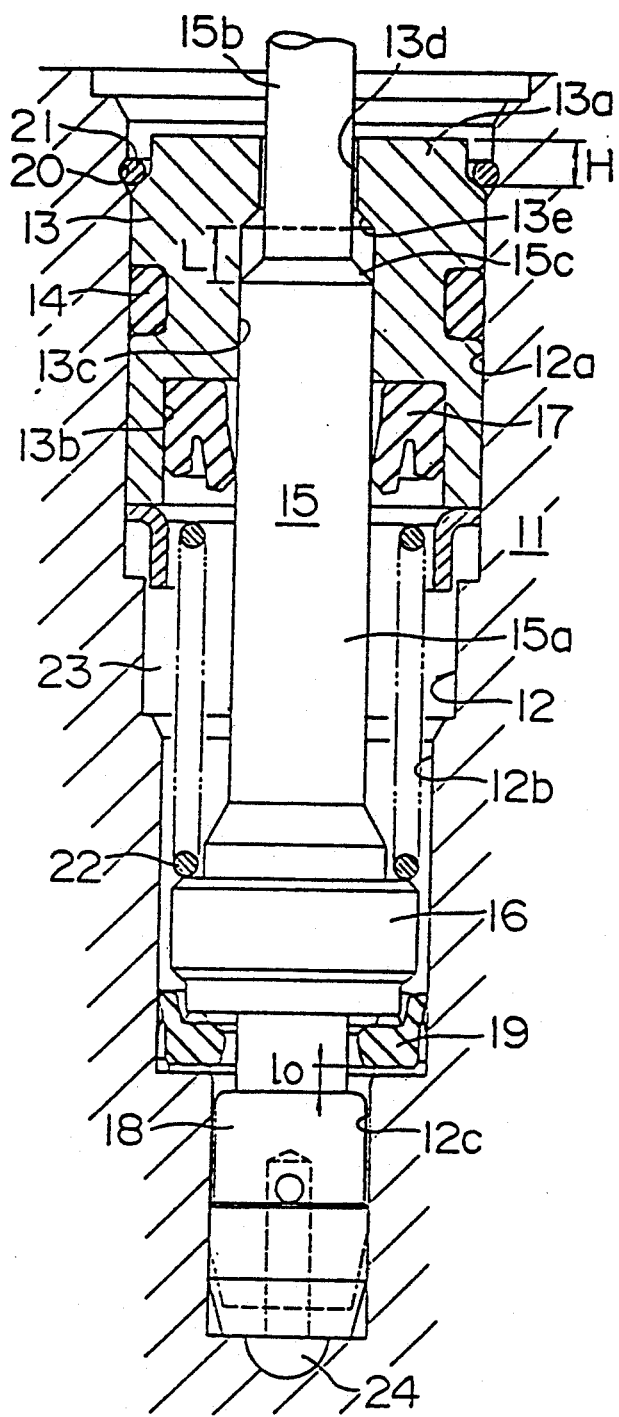
FIG. 1 is a sectional view of the main portion of a proportioning valve in accordance with the present invention, showing the case where the retaining ring is properly set into the annular groove of the valve housing.

FIG. 1 shows only the main portion of a proportioning valve in accordance with the present invention.

In this proportioning valve, the cylinder hole 12 of the valve housing 11 has a large-diameter portion 12a, an intermediate-diameter portion 12b, and a small-diameter portion 12c. These large-diameter portion 12a, intermediate-diameter portion 12b, and small-diameter portion 12c are arranged in that order. In the large-diameter portion 12a of the cylinder hole 12, a retainer 13 is disposed.

This retainer 13 has an O-ring 14 at its periphery, which is slidably in contact with the large-diameter portion 12a of the cylinder hole 12. The retainer 13 has a columnar portion 13a having conditions described later at its top. The retainer has holes 13b, 13c, 13d consisting of a large-diameter portion, an intermediate-diameter portion, and a small-diameter portion at its axial center.

A plunger 15 is inserted into the holes 13b, 13c, 13d. The plunger 15 has a flange 16 at the intermediate position in the axial direction. The upper portion of the plunger 15 above the flange 16 is formed from a large-diameter portion 15a and a small-diameter portion 15b. The large-diameter portion 15a of the plunger 15 is slidably in contact with the intermediate-diameter portion 13c of the retainer 13, so that the plunger 15 is guided by the intermediate-diameter portion 13c of the retainer 13. At the large-diameter portion 13b of the retainer 13, a cup packing 17 is installed, which abuts against the peripheral surface of the large-diameter portion 15a of the plunger 15. The boundary between the intermediate-diameter portion 13c and the small-diameter portion 13d of the retainer 13 serves as a stopper 13e, against which a step portion 15c at the boundary between the large-diameter portion 15a and the small-diameter portion 15b of the plunger 15 abuts to inhibit the upward movement of the plunger 15.

A valve element 18 is formed at the lower end of the plunger 15. This valve element 18 is positioned at the small-diameter portion 12c of the cylinder hole 12. At the lower end of the intermediate-diameter portion 12b of the cylinder hole 12, a valve seat 19 is installed. This valve seat 19 and the valve element 18 form a valve.

An annular groove 20 is formed in the large-diameter portion 12a of the cylinder hole 12, and a retaining ring 21 is set into the annular groove 20.

Figure 2:
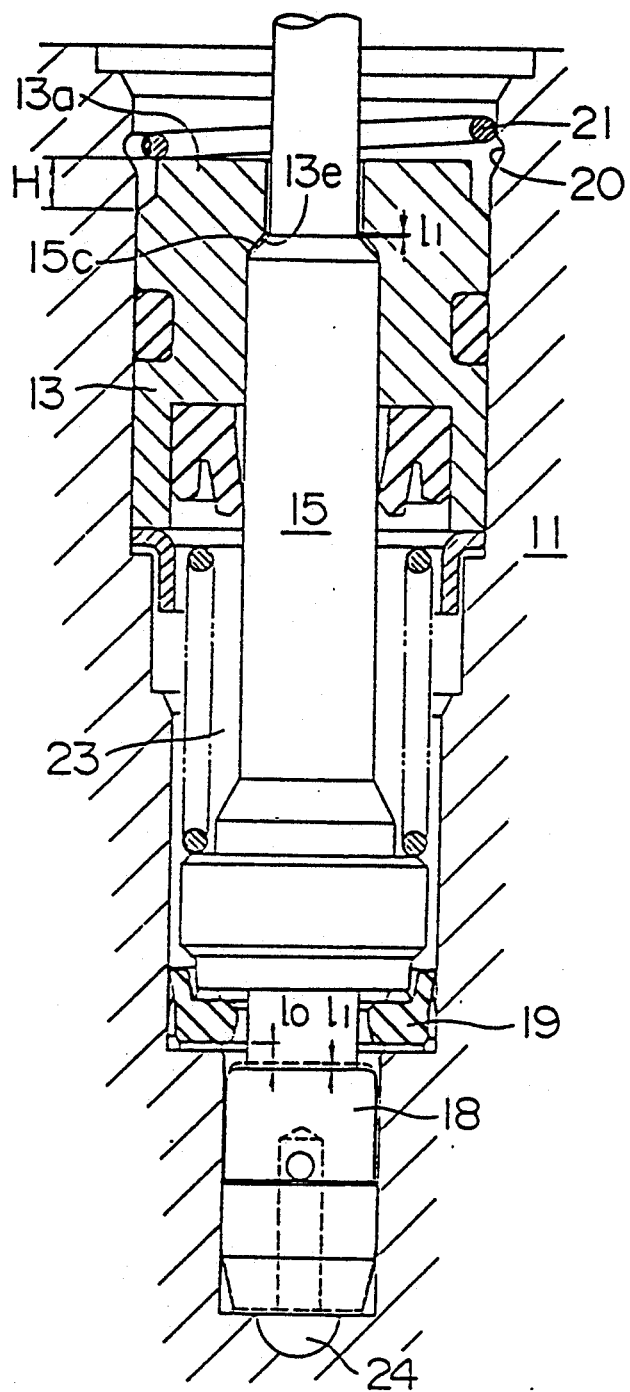
FIG. 2 is a sectional view of the main portion of a proportioning valve in accordance with the present invention, showing the case where only a part of the retaining ring is set into the annular groove.
Figure 3:
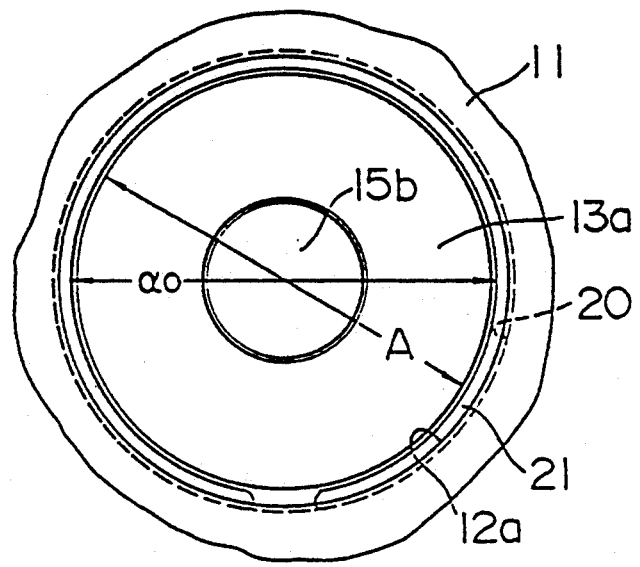
FIG. 3 is a view showing the relationship between the retainer and the retaining ring in the case of FIG. 1.
Figure 4:
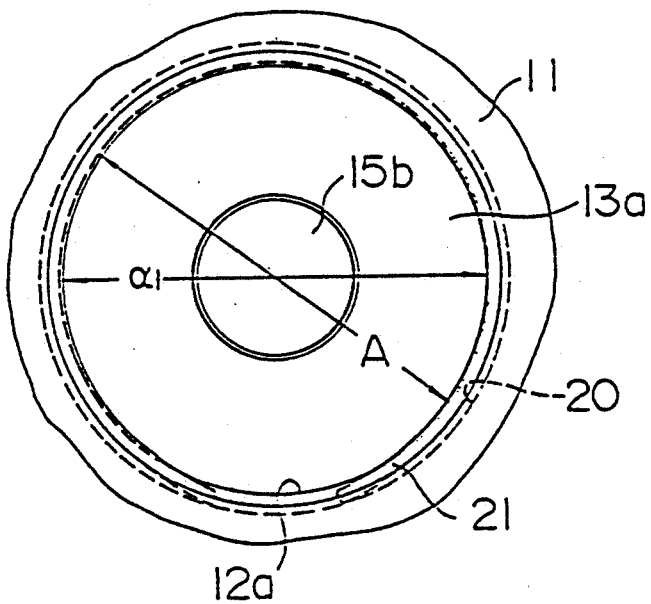
FIG. 4 is a view showing the relationship between the retainer and the retaining ring in the case of FIG. 2.
Figure 5:
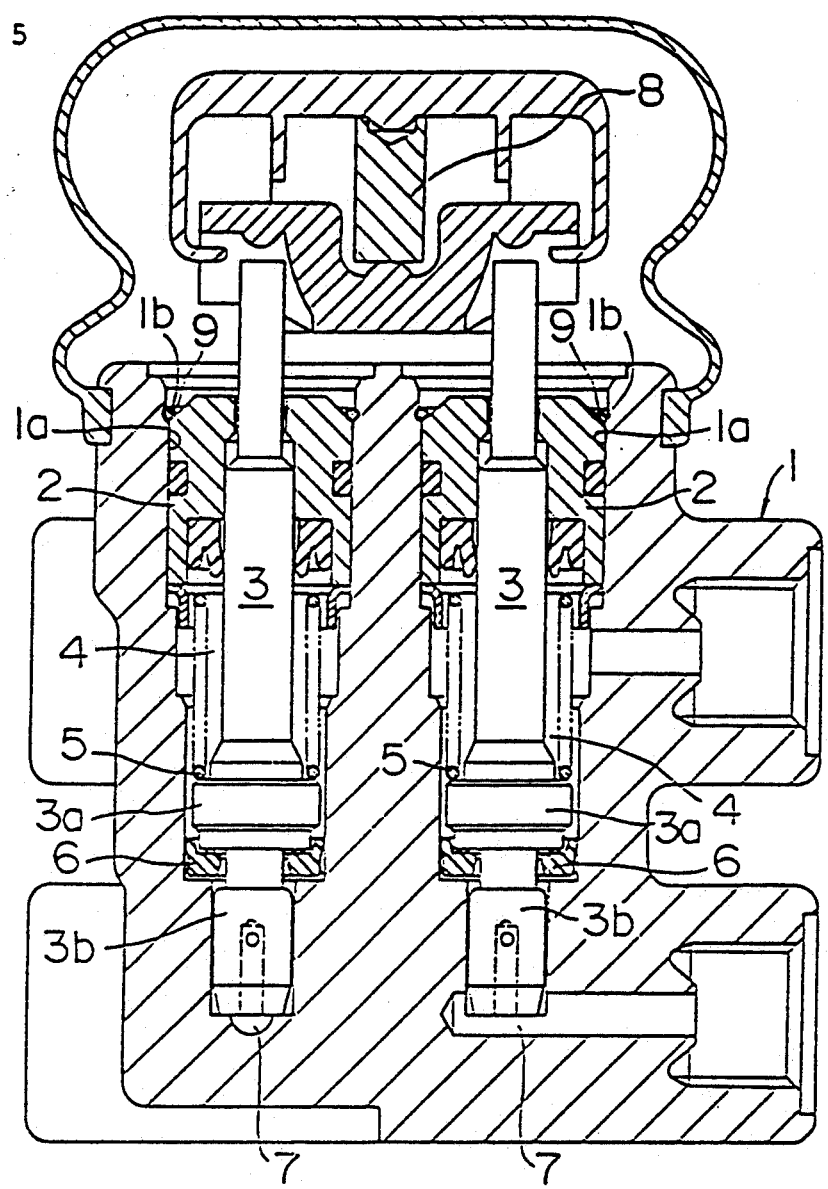
FIG. 5 is a sectional view of a conventional proportioning valve.

The outside diameter A of the columnar portion 13a of the retainer is set to be smaller than the inside diameter $\alpha_0$ of the retaining ring 21 which is completely set into the annular groove 20 as shown in FIG. 1 (see FIG. 3), and to be larger than the inside diameter $\alpha_0$ of the retaining ring 21 which gets out of the annular ring 20 as shown in FIG. 2 (see FIG. 4).

Between the retainer 13 and the flange 16 of the plunger 15, a spring 22 is interposed, which energizes the plunger 15 downward. Therefore, the valve element 18 is positioned apart from the valve seat 19, thereby the valve opening condition being kept.

As shown in FIG. 1, the distance L between the stopper 13e and the step portion 15c in the case where the retaining ring 21 is completely set into the annular groove 20 is set to be larger than the distance $l_0$ for the valve element to abut against the valve seat 19. The height H of the columnar portion 13a of the retainer 13 is set so that H is larger than $L-l_0$.

Therefore, although the plunger 15 opens the valve when the retaining ring 21 is completely set into the annular groove 20, the plunger 15 cannot open the valve if only a part of the retaining ring 21 is caught by the annular groove 20 as shown in FIG. 2, because the retainer 13 is located a the position the height H lower than the predetermined position. As shown in FIG. 2, if the retainer 13 is located at the lower position, the distance $l_1$ between the step portion 15c of the plunger 15 and the stopper 13e becomes $L-H$, being smaller than $l_0$; therefore, the step portion 15c of the plunger 15 abuts against the stopper 13e before the valve element 18 abuts against the valve seat 19.

Whether the retainer 13 of this proportioning valve is located at the predetermined position can be checked in the characteristic test of the proportioning valve.

In the characteristic test of this proportioning valve, just as in the test of the conventional proportioning valve, oil is supplied to the input pressure chamber 23 to detect the pressures in the input pressure chamber 23 and the output pressure chamber 24, and a check is made to see whether the pressure in the output pressure chamber 24 is in a predetermined range with respect to the pressure in the input pressure chamber 23.

Figure 6:
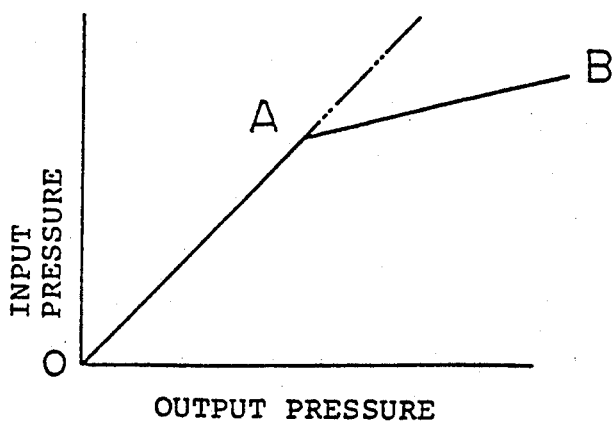
FIG. 6 is a characteristic diagram of a proportioning valve.
Figure 7:
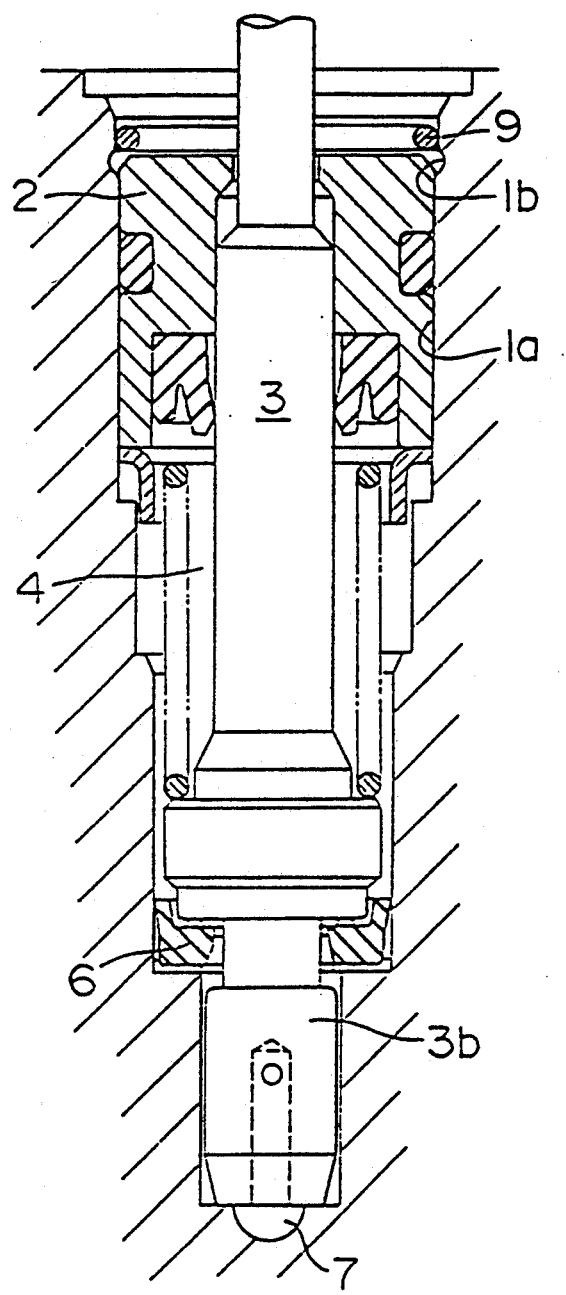
FIG. 7 is a sectional view of the main portion of a conventional proportioning valve, showing the case where the retaining ring completely gets out of the annular ring of the valve housing.
Figure 8:
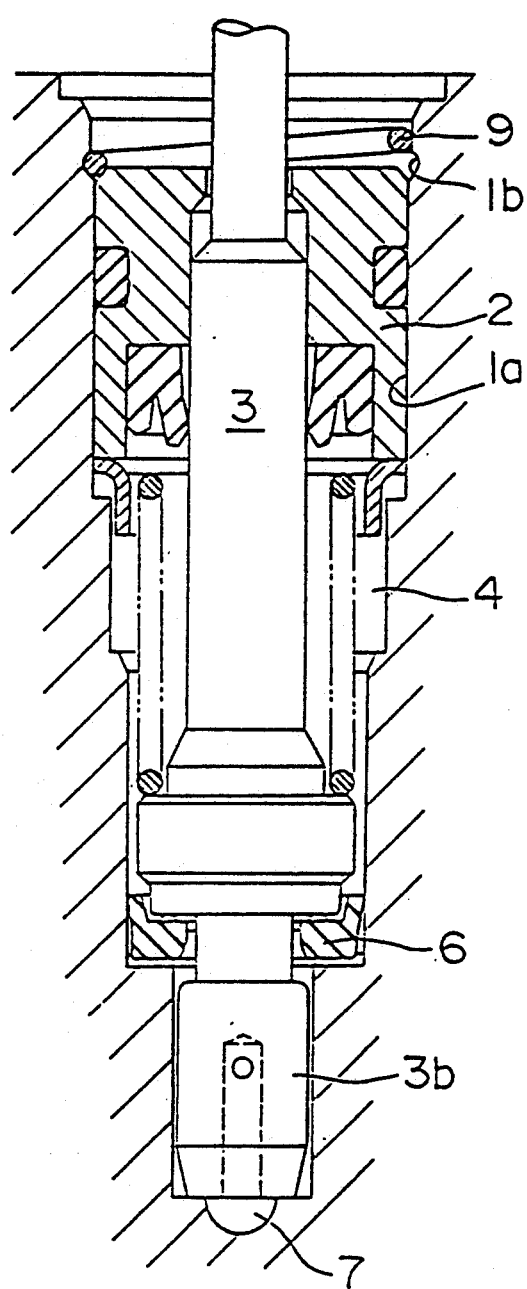
FIG. 8 is a sectional view of the main portion of a conventional proportioning valve, showing the case where only a part of the retaining ring is set into the annular groove.

The proportional valve has a characteristic shown in FIG. 6 when it is normal. If a retaining ring is installed in such a manner that only a part of the retaining ring 21 is caught by the annular groove 20, the pressure in the output pressure chamber 24 increases the same as that in the input pressure chamber 23 as indicated by the alternate long and two short dashes line exceeding inflection point A in FIG. 6 because the valve is not closed. From this result, it is confirmed that the valve is not closed, by which it can be found that the retaining ring 21 is not installed at the predetermined position.

If the retaining ring 21 completely gets out of the annular groove 20, the retainer 13 moves out upward by the pressure in the input pressure chamber 23. Therefore, the pressure in the input pressure chamber 23 does not increase, by which it can be found that the retaining ring 21 is not installed at the predetermined position.

I claim:

1. In a proportioning valve, said valve comprising a valve body having a pressure inlet and a pressure outlet, said valve body having a bore therein, said bore including a valve seat therein, a retainer slidably received in said bore, said retainer having at least one bore therein, at least one plunger slidably received in said retainer bore, said plunger including a valve element, said valve element and said valve seat cooperating to form a closed valve between said pressure inlet and said pressure outlet when said plunger is in a closed position with respect to said retainer and to form a communicating passage between said pressure inlet and said pressure outlet when said plunger is in an open position with respect to said retainer, a spring means for biasing said plunger towards said open position, an $l_0$ is a distance said plunger moves between a limit of movement of said plunger relative to said valve seat towards the open position and a closed position of said valve, an improvement comprising:

means for limiting the movement of said plunger relative to said retainer from an open position towards said closed position to a distance L; and means for retaining said retainer in a retained position with respect to said valve body when installed, for not retaining said retainer at all when not installed and for retaining said retainer in a position extended towards said valve seat when partially installed, said retained position and said position extended towards said valve seat differing by a distance H, where said distance H is greater than $L-l_0$.

2. A proportioning valve improvement according to claim 1, wherein said means for limiting plunger movement comprises a necked down diameter portion of said retainer bore and a corresponding necked down portion of said plunger, said respective necked down portions of said retainer and plunger limiting the movement of said plunger relative to the retainer in a valve closing direction, and said valve body bore is a cylindrical bore, and said retaining means comprises a retaining ring, an annular groove in said cylindrical bore and a means on said retainer for engaging said ring when installed in said groove and for preventing movement of said retainer in a direction out of said cylindrical bore beyond said retained position, said ring permitting movement of said retainer in said direction when not installed in said groove, and said ring not permitting movement in said direction beyond said extended position when partially installed in said groove.

3. A proportioning valve improvement according to claim 2, wherein said retainer includes a columnar portion having a diameter smaller than said diameter slidingly received in said cylindrical bore, said retainer having a shoulder where said smaller diameter meets said diameter slidingly received in said bore, said shoulder bearing on said ring when said ring is installed in said groove and said retainer is in said retained position, said ring having an inside diameter when installed in said groove and a smaller inside diameter when said ring is in said bore but not installed in said groove, said diameter of said columnar portion is smaller than said ring inside diameter when said ring is installed in said groove and larger than said ring inside diameter when said ring is not installed in said groove but is disposed in said cylindrical bore.

4. A proportioning valve improvement according to claim 2, wherein said retainer retainer includes a columnar portion having a diameter smaller than said diameter slidingly received in said cylindrical bore, said retainer having a shoulder where said smaller diameter meets said diameter slidingly received in said bore, said shoulder bearing on said ring when said ring is installed in said groove and said retainer is in said retained position, said ring having an inside diameter when installed in said groove and a smaller inside diameter when said ring is in said bore but not installed in said groove, said diameter of said columnar portion is smaller than said ring inside diameter when said ring is installed in said groove and larger than said ring inside diameter when said ring is only partially installed in said groove.

5. A proportioning valve, said proportioning valve comprising:

a valve body having a pressure inlet and a pressure outlet, said valve body having a bore therein, said bore including a valve seat therein;

a retainer slidably received in said bore, said retainer having at least one bore therein;

at least one plunger slidably received in said retainer bore, said plunger including a valve element, said valve element and said valve seat cooperating to form a closed valve between said pressure inlet and said pressure outlet when said plunger is in a closed position with respect to said retainer and to form a communicating passage between said pressure inlet and said pressure outlet when said plunger is in an open position with respect to said retainer, spring means for biasing said plunger towards said open position, $l_0$ is a distance said plunger moves between a limit of movement of said plunger relative to said valve seat towards the open position and a closed position of said valve;

means for limiting the movement of said plunger relative to said retainer from an open position towards said closed position to a distance L; and means for retaining said retainer in a retained position with respect to said valve body when installed and for not retaining said retainer at all when not installed and for retaining said retainer in a position extended towards said valve seat when partially installed, said retained position and said position extended towards said valve seat differing by a distance H, where said distance H is greater than $L-l_0$.

* * * * *